(No Model.)
A. F. BERNARD.
LOCK AND DUMPING MECHANISM FOR WHEELED SCRAPERS.
No. 516,044. Patented Mar. 6, 1894.
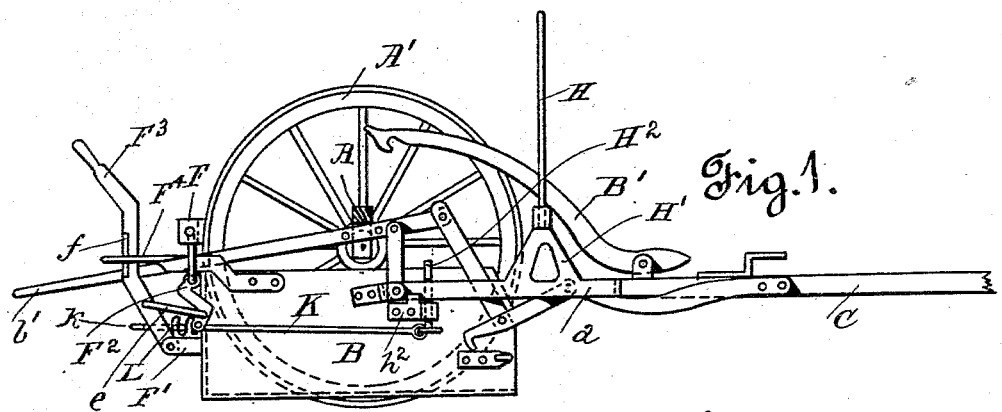
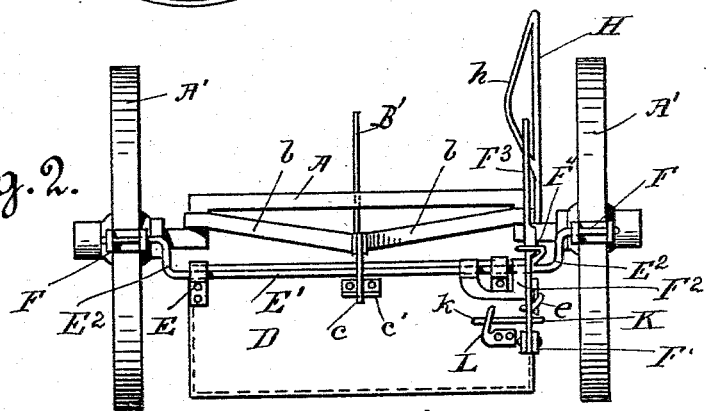
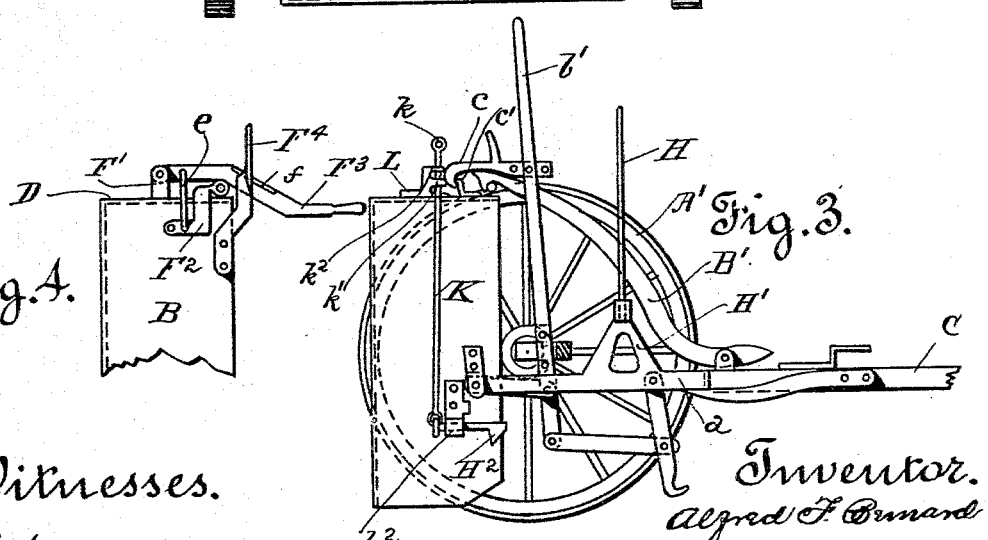
Witnesses.
Inventor.
Alfred F. Bernard
By N. A. Acker
Atty

UNITED STATES PATENT OFFICE.

ALFRED F. BERNARD, OF SAN LUIS OBISPO, CALIFORNIA.

LOCK AND DUMPING MECHANISM FOR WHEELED SCRAPERS.

SPECIFICATION forming part of Letters Patent No. 516,044, dated March 6, 1894.

Application filed May 29, 1893. Serial No. 475,853. (No model.)

*To all whom it may concern:*

Be it known that I, ALFRED F. BERNARD, a citizen of the United States, residing at San Luis Obispo, in the county of San Luis Obispo and State of California, have invented certain new and useful Improvements in Lock and Dumping Mechanism for Wheeled Scrapers; and I do hereby declare the following to be a full, clear, and exact description of said invention, such as will enable others skilled in the art to which it most nearly appertains to make, use, and practice the same.

The present invention relates to certain new and useful improvements in wheeled scrapers, and more especially to an improved mechanism whereby the wheels may be braked while the scraper is descending hills, or at such points as it is desired to dump the body of the scraper, and mechanism which will effectually lock the body so as to hold the same in a horizontal position in order to prevent the tilting thereof, in case the front edge should contact with stumps, stones, &c., during the travel of the scraper to the place of dump, hence overcoming the liability of the scraper body prematurely tilting and dumping the contents thereof, except at the designated dumping grounds, all of which mechanism shall be under the control of the operator or driver of the scraper.

Referring to the drawings forming a part of this application, wherein similar letters of reference denote corresponding parts throughout the entire specification and several views, Figure 1, is a view in side elevation with one wheel of the scraper removed, showing the lock mechanism attached thereto. Fig. 2, is a rear elevation of Fig. 1; Fig. 3, a similar view as Fig. 1, showing the scraper body in a tilted position; and Fig. 4, a detail broken view of the swinging body.

The axle of the scraper is indicated by the letter A, to the ends of which the wheels A', are secured. Below the axle A, is suspended the swinging scraper body B, which is movably connected to the ends of straps or brace bars $a$, which support the tongue C. From the tongue rearwardly extends the hooked end catch bar B', which holds the scraper body in its raised position when the same is tilted or swung upward as shown in Fig. 3.

From the axle A, rearwardly extend the rods or straps $b$, which terminate in a handle $b'$. Downwardly from between the straps $b$, projects the catch hook $c$, which engages with shoulder $c'$, secured to back D, of the scraper body. The catch hook $c$, is pivoted between the ends of rods $b$. The object of handle $b'$, is to enable the operator to raise the body clear of the ground when filled with dirt. All these parts are of the usual construction and form no part of my invention, consequently need not be specifically described.

To the upper portion of the back D, of the scraper, I bolt or otherwise secure the ears or clips E, through which extends the brake rod E', the ends of which rod project beyond the body of the scraper and are bent upward and outward so as to form a knee bend $E^2$. To the ends of the brake rod E', I secure the brake shoes or rubbers F, which contact with the wheels when the rod E', is thrown over. This rod is oscillated in order to put the brake on or off, by means of the lever $F^3$, which is pivoted within the bifurcated portion of standard or bracket F'. Said lever is connected to crank lever $F^2$, which is fastened to the rod E', by means of connecting link $e$. Consequently as the lever is thrown in or out an opposite movement is given said crank lever, which oscillates the brake rod. The lever has a flange $f$, projecting therefrom which engages with the teeth of the quadrant $F^4$, in order to hold same in locked position. When the brake has been applied and the scraper body tilted over, as shown in Fig. 3, it is desirable that the wheels be unlocked without waiting for the body to swing back into horizontal position, in order to save delay of the team. In order to accomplish this, I have provided a device which will automatically release the lever $F^3$, which consists of the upright or rod H, removably secured within support H'. This rod is provided with a downwardly extending curved arm $h$. As the body is swung over, in order to dump the load thereof, the outer face of lever $F^3$, contacts with the enlarged bulged portion of the outwardly curved arm $h$, and inasmuch as the curved arm projects inwardly beyond the path of said lever, it is obvious that the lever is forced sidewise and out of engagement with the notched quadrant, which releases the brake shoes from contact with the wheels. For the purpose of overcoming the tilting of the body when same contacts with a stone or other obstruction along the road of travel, I attach thereto a device which will lock or prevent the body swinging until the operator desires it to, which consists of the hooked rods $H^2$, seated within the ear $h^2$, fastened to the forward portion of the body. The hooked end of this rod projects above the tongue support or brace rods $a$, and when the rod is turned at an angle, see Fig. 1, the hooked end thereof will fit over the top of said rods. This will prevent the forward end of the body moving downward, thus holding the body in a horizontal position. The lower end of the rod $H^2$, projects below ear $h^2$, and has connected thereto the rearwardly extending operating rod K, the end of which is inturned and terminates in a ring handle $k$. As this rod is pushed in or out, the hooked rod $H^2$, is likewise moved, which movement locks or unlocks the swinging body. The rod K is held in place by the inturned end being secured within the inner and outer notches $k'$, $k^2$, of standard L, which is fastened to back D, of the body.

It will be readily seen that when the rod $H^2$ is turned so as to lock the body and the brake shoes are applied to the wheels, the wheels will be locked against all rotation.

Having thus described my invention, what I claim as new, and desire to secure protection in by Letters Patent of the United States, is—

1. In a wheeled scraper, the combination with the wheels and the body, of the oscillating brake rod mounted on the body and having shoes on its ends adapted to bear upon the wheels, an operating lever fulcrumed upon the body, a crank lever secured to and depending from the brake rod, and a link connecting said crank lever with the operating lever.

2. In a wheeled scraper, the combination with the truck and the body, of the brake rod mounted on the body, an operating lever mounted on the body and connected with said brake rod, a quadrant on the body adapted to hold the operating lever, and a deflector or cam on the truck adapted to impinge upon and release the operating lever from the quadrant when the body is tilted.

3. In a wheeled scraper, the combination with the body and its support, of a rotary hooked rod mounted on the side of the body and adapted to engage over the support, an operating rod connected to the lower end of the hooked rod and extending in rear of the body, and a notched standard on the rear end of the body adapted to be engaged by the operating rod to hold the hooked rod in or out of engagement with the body support.

In testimony whereof I affix my signature in presence of two witnesses.

ALFRED F. BERNARD.

Witnesses:
  N. A. ACKER,
  LEE D. CRAIG.